United States Patent
Lin et al.

(10) Patent No.: US 11,380,244 B2
(45) Date of Patent: Jul. 5, 2022

(54) DISPLAY DEVICE INTEGRATING DISPLAY FUNCTION AND FINGERPRINT SCANNING FUNCTION

(71) Applicant: InnoLux Corporation, Miao-Li County (TW)

(72) Inventors: Shun-Mao Lin, Miao-Li County (TW); Hsing-Yuan Hsu, Miao-Li County (TW); Po-Yang Chen, Miao-Li County (TW); I-An Yao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/408,499

(22) Filed: Aug. 23, 2021

(65) Prior Publication Data
US 2022/0093032 A1    Mar. 24, 2022

(30) Foreign Application Priority Data
Sep. 23, 2020    (CN) .......................... 202011008877.7

(51) Int. Cl.
*G06V 40/13*    (2022.01)
*G09G 3/20*    (2006.01)

(52) U.S. Cl.
CPC ....... *G09G 3/2092* (2013.01); *G06V 40/1318* (2022.01); *G09G 2310/0267* (2013.01); *G09G 2310/0286* (2013.01); *G09G 2310/0297* (2013.01)

(58) Field of Classification Search
CPC ......... G09G 3/2092; G09G 2310/0267; G09G 2310/0286; G09G 2310/0297; G06V 40/1318
See application file for complete search history.

(56) References Cited

U.S. PATENT DOCUMENTS

| 2016/0148036 | A1* | 5/2016 | Kim ..................... G06K 9/0004 382/124 |
| 2018/0293943 | A1* | 10/2018 | Hong ................... G09G 3/3266 |
| 2020/0065541 | A1 | 2/2020 | Jung |
| 2021/0109636 | A1* | 4/2021 | Lius ..................... G06F 3/0412 |
| 2021/0350107 | A1* | 11/2021 | Tai ..................... G06K 9/00087 |

* cited by examiner

*Primary Examiner* — Stephen G Sherman
(74) *Attorney, Agent, or Firm* — Winston Hsu

(57) ABSTRACT

A display device includes a peripheral circuit, a display gate line and a fingerprint gate line. The peripheral circuit includes a demultiplexer. The display gate line is electrically connected to the demultiplexer for transmitting a display scan signal. The fingerprint gate line is electrically connected to the demultiplexer for transmitting a fingerprint scan signal.

17 Claims, 5 Drawing Sheets

DISPLAY DEVICE INTEGRATING DISPLAY FUNCTION AND FINGERPRINT SCANNING FUNCTION

BACKGROUND OF THE DISCLOSURE

1. Field of the Disclosure

The present disclosure relates to a display device, and more particularly, a display device which integrates a display function and fingerprint scanning function.

2. Description of the Prior Art

As mobile devices become more and more widely used, mobile devices often can perform biometric recognition, for example, verification of a user's identity can be achieved by recognizing the user's fingerprint.

For example, a mobile device can use a photosensitive element to capture the fingerprint characteristics of the user for identification. In particular, to facilitate user operations, the photosensitive element is integrated with the display panel of the mobile device. In this case, both the circuits for driving the photosensitive elements and the circuit for driving the display panel are arranged in the peripheral area of the display panel, which makes it difficult to reduce the width of the peripheral area of the display panel.

SUMMARY OF THE DISCLOSURE

An embodiment discloses a display device comprising a peripheral circuit, a display gate line and a fingerprint gate line. The peripheral circuit comprises a demultiplexer. The display gate line is electrically connected to the demultiplexer for transmitting a display scan signal. The fingerprint gate line is electrically connected to the demultiplexer for transmitting a fingerprint scan signal.

These and other objectives of the present disclosure will no doubt become obvious to those of ordinary skill in the art after reading the following detailed description of the embodiment that is illustrated in the various figures and drawings.

DETAILED DESCRIPTION

Figure 1:
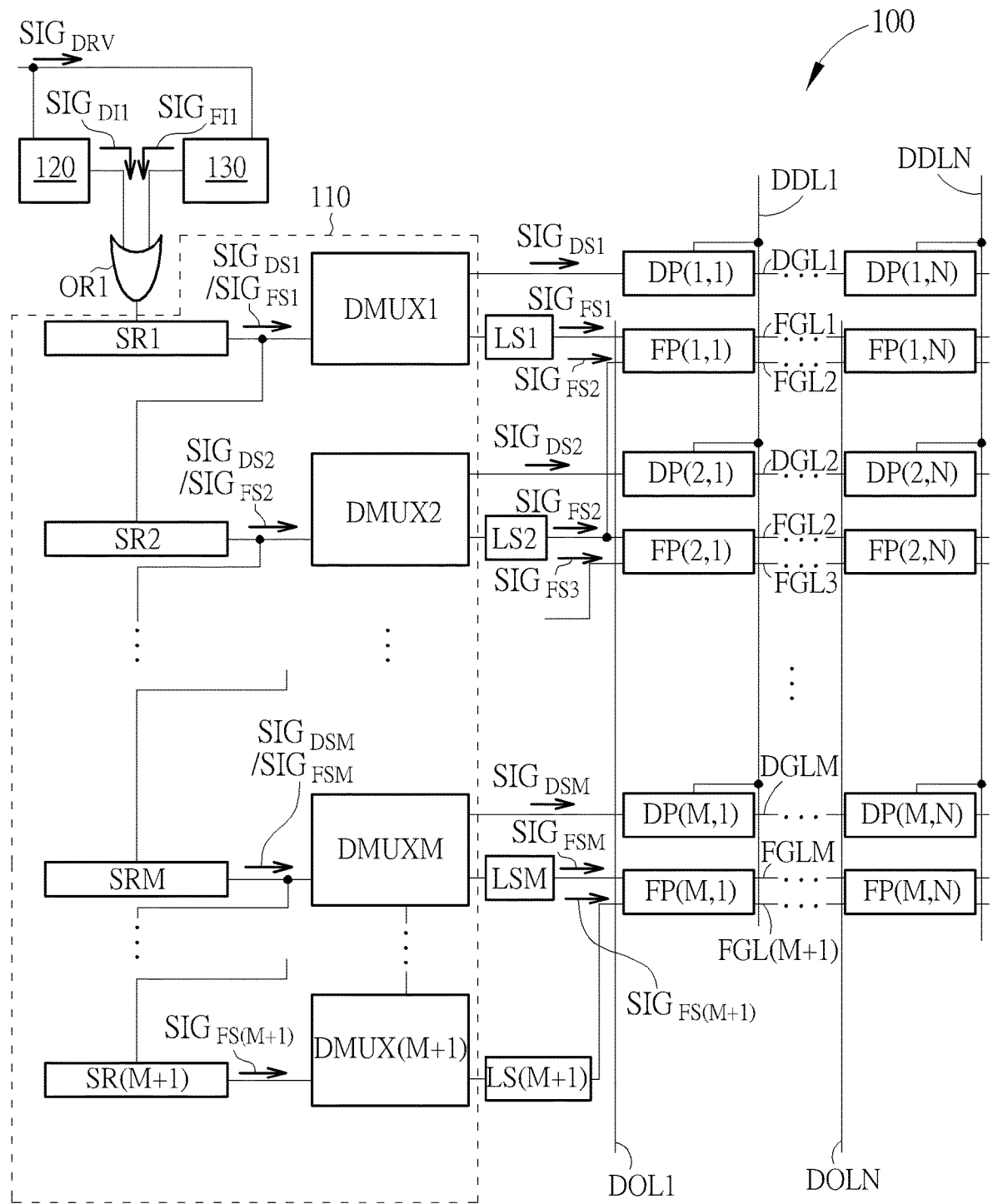
FIG. 1 is a schematic diagram of a display device according to an embodiment of the disclosure.

Reference will now be made in detail to some embodiments of the present disclosure, and examples of some embodiments are illustrated in the accompanying drawings. Whenever possible, the same component symbols are used in the drawings and descriptions to indicate the same or similar parts.

A structure (or layer, component, substrate) described in this disclosure is located on/above another structure (or layer, component, substrate), which can mean that the two structures are adjacent and directly connected, or can mean that two structures are adjacent but not directly connected. Indirect connection means that there is at least one intermediate structure (or intermediate layer, intermediate component, intermediate substrate, intermediate space) between two structures, and the lower surface of a structure is adjacent or directly connected to the upper surface of the intermediate structure, the upper surface of another structure is adjacent or directly connected to the lower surface of the intermediate structure, and the intermediate structure can be composed of a single-layer or multi-layer structure or a non-physical structure, and not limited thereto. In this disclosure, when a structure is "on" another structure, it may mean that a structure is "directly" on another structure, or that a structure is "indirectly" on another structure, that is, between a structure and another structure is a structure therebetween.

The electrical connection and coupling described in this disclosure can both refer to direct connection or indirect connection. In the case of direct connection, the endpoints of the components on the two circuits are directly connected or connected to each other through a conductive path. In the case of indirect connection, there are switches, diodes, capacitors, inductors, resistors, other suitable components, or a combination of the above components between the terminals of the components on the two circuits, but it is not limited thereto.

Although the terms first, second, third . . . can be used to describe various elements, the elements are not limited to these terms. These terms are only used to distinguish an element from other elements in the specification. A term in the embodiment may be named differently in the claims, and the elements in the claims may be replaced with first, second, third . . . according to the order of the elements being introduced in the claims. Therefore, in the following description, the first element may be renamed as the second element in the claims.

In the present disclosure, the display device has a display function, and may optionally include sensing, touch, antenna, other suitable functions, or a combination of the above functions, but is not limited thereto. In some embodiments, the display device may include a splicing device, but is not limited thereto. The display device may include liquid crystal molecules (LC molecule), organic light-emitting diodes (OLEDs), inorganic light-emitting diodes, such as micro light-emitting diodes, quantum dot (QDs) materials, quantum dot light-emitting diodes (QLED, QDLED), fluorescence materials, phosphor materials, and other suitable materials or a combination of the above, but not limited thereto. In addition, the display device may be a color display device or a monochrome display device, and the shape of the display device may be a rectangle, a circle, a polygon, a shape with a curved edge, or other suitable shapes, but it is not limited thereto. In the following, the display device is exemplified as a color display device with light-emitting diodes (such as organic light-emitting diodes, inorganic light-emitting diodes, or quantum dot light-emitting diodes), but the display device is not limited thereto. In some embodiments, the display device may also be a display device including a liquid crystal panel or another suitable display device. FIG. 1 is a schematic diagram of a display device 100 according to an embodiment of the disclosure. The display device 100 comprises a peripheral circuit 110, a display gate line DGL1 to a display gate line DGLM, and a fingerprint gate line FGL1 to a fingerprint gate line FGL(M+1), where M is a positive integer greater than 1. In FIG. 1, the display device 100 may further comprise a display pixel DP(1,1) to a display pixel DP(M,N) and a photosensitive pixel FP(1,1) to a photosensitive pixel FP(M,N).

In FIG. 1, the display pixel DP(1,1) to the display pixel DP(1,N) can be electrically connected to the display gate line DGL1, and can be electrically connected to the display data line DDL1 to the display data line DDLN, respectively. In the display scanning operation, the display pixel DP(1,1) to the display pixel DP(1,N) can synchronously display the display data on the display data line DDL1 to the display data line DDLN according to the display scan signal $SIG_{DS1}$ on the display gate line DGL1. Similarly, the display pixel DP(M,1) to the display pixel DP(M,N) can be electrically connected to the display gate line DGLM, and can be electrically connected to the display data line DDL1 to the display data line DDLN, respectively. In this case, the display pixel DP(M,1) to the display pixel DP(M,N) can synchronously display the display data on the display data line DDL1 to the display data line DDLN according to the display scan signal $SIG_{DSM}$ on the display gate line DGLM. In this way, after the display scanning operation is completed, the display pixel DP(1,1) to the display pixel DP(M,N) can emit color light of corresponding intensities according to the received display data to jointly present the image to be displayed. In some embodiments, the display pixel DP(1,1) to the display pixel DP(M,N) may each being a monochromatic pixel. For example, the display pixel DP(1,1) is a red pixel, the display pixel DP(1,2) is a green pixel, the display pixel DP(1,3) is a blue pixel arranged in sequence all the way to the display pixel DP(M,N), and the disclosure is not limited thereto. In some embodiments, the display pixel DP(1,1) to the display pixel DP(M,N) may each being a multi-color pixel. For example, the display pixel DP(1,1) may comprise a red sub-pixel and a green sub-pixel, the display pixel DP(1,2) may comprise a green sub-pixel and a blue sub-pixel, and are arranged in sequence all the way to the display pixel DP(M,N). In another example, the display pixel DP(1,1) may comprise a red sub-pixel, a green sub-pixel and a blue sub-pixel, the display pixel DP(1,2) may also comprise a red sub-pixel, a green sub-pixel, and a blue sub-pixel, which are arranged in sequence all the way to the display pixel DP(M,N). The disclosure is not limited thereto.

In addition, the photosensitive pixel FP(1,1) to the photosensitive pixel FP(1,N) can be electrically connected to the fingerprint gate line FGL1, and can be electrically connected to the data readout line DOL1 to the data readout line DOLN, respectively. In the fingerprint scanning operation, the photosensitive pixel FP(1,1) to the photosensitive pixel FP(1,N) can synchronously output the photosensitive data to the data readout line DOL1 to data readout line DOLN according to the fingerprint scan signal $SIG_{FS1}$ on the fingerprint gate line FGL1. Similarly, the photosensitive pixel FP(M,1) to the photosensitive pixel FP(M,N) can be electrically connected to the fingerprint gate line FGLM, and can be electrically connected to the data readout line DOL1 to the data readout line DOLN, respectively. In this case, the photosensitive pixel FP(M,1) to the photosensitive pixel FP(M,N) can synchronously output the photosensitive data to the data readout line DOL1 to the data readout line DOLN according to the fingerprint scan signal $SIG_{FSM}$ on the fingerprint gate line FGLM. In this way, after the fingerprint scanning operation is completed, the photosensitive pixel FP(1,1) to the photosensitive pixel FP(M,N) can output photosensitive data according to their respective photosensitive states for the system to determine the result of the fingerprint scan.

In some embodiments, the peripheral circuit 110 may comprise a demultiplexer DMUX1 to a demultiplexer DMUXM. The demultiplexer DMUX1 may be electrically connected to the display gate line DGL1 and the fingerprint gate line FGL1, and the demultiplexer DMUXM can be electrically connected to the display gate line DGLM and the fingerprint gate line FGLM. The demultiplexer DMUX1 can transmit the display scan signal $SIG_{DS1}$ via the display gate line DGL1 or the fingerprint scan signal $SIG_{FS1}$ via the fingerprint gate line FGL1. Similarly, the demultiplexer DMUXM can transmit the display scan signal $SIG_{DSM}$ via the display gate line DGLM or the fingerprint scan signal $SIG_{FSM}$ via the fingerprint gate line FGLM.

In other words, by switching the operation mode of the demultiplexer DMUX1 to the demultiplexer DMUXM, the peripheral circuit 110 can use the same circuit to generate the display scan signal $SIG_{DS1}$ to the display scan signal $SIG_{DSM}$ and the fingerprint scan signal $SIG_{FS1}$ to the fingerprint scan signal $SIG_{FSM}$, and send the corresponding signal to the display gate line DGL1 to the display gate line DGLM and the fingerprint gate line FGL1 to the fingerprint gate line FGLM. In this way, the circuit area required by the peripheral circuit 110 can be reduced, and thus the frame width of the display device 100 can be reduced.

In FIG. 1, the peripheral circuit 110 may comprise a shift register SR1 to a shift register SRM. The shift register SR1 to the shift register SRM can be electrically connected to the demultiplexers DMUX1 to DMUXM, respectively. The shift register SR1 can generate the display scan signal $SIG_{DS1}$ according to a display scan start signal $SIG_{DI1}$, and the fingerprint scan signal $SIG_{FS1}$ according to a fingerprint scan start signal $SIG_{FI1}$. The shift register SR2 can generate the display scan signal $SIG_{DS2}$ according to the display scan signal $SIG_{DS1}$, and the fingerprint scan signal $SIG_{FS2}$ according to the fingerprint scan signal $SIG_{FS1}$, and so on.

In some embodiments, since the display pixel DP(M,1) to the display pixel DP(M,N) and the photosensitive pixel FP(M,1) to the photosensitive pixel FP(M,N) have different configurations, the required signal voltages are also different. In other words, the voltage of the display scan signal $SIG_{DS1}$ to the display scan signal $SIG_{DSM}$ may be different from the voltage of the fingerprint scan signal $SIG_{FS1}$ to the fingerprint scan signal $SIG_{FSM}$. In this case, the display device 100 may further comprise a voltage conversion circuit LS1 to a voltage conversion circuit LSM. The voltage conversion circuit LS1 can be electrically connected to the demultiplexer DMUX1 and the fingerprint gate line FGL1, and can adjust the voltage of the fingerprint scan signal $SIG_{FS1}$. Similarly, the voltage conversion circuit LSM can be electrically connected to the demultiplexer DMUXM and the fingerprint gate line FGLM, and can adjust the voltage of the fingerprint scan signal $SIG_{FSM}$. In this way, the peripheral circuit 110 can use the shift register SR1 to the shift register SRM to generate the scan signals to drive the display pixel DP(1,1) to the display pixel DP(M,N) and the photosensitive pixel FP(1,1) to the photosensitive pixel FP(M,N).

In addition, in some embodiments, each photosensitive pixel FP(1,1) to photosensitive pixel FP(M,N) can be electrically connected to two fingerprint gate lines for performing a reset operation and a readout operation. For example, the photosensitive pixel FP(1,1) to the photosensitive pixel FP(1,N) can be electrically connected to the fingerprint gate lines FGL1 and FGL2, and the photosensitive pixel FP(1,1)

to the photosensitive pixel FP(1,N) can perform the readout operation according to the fingerprint scan signal $SIG_{FS1}$ transmitted by the fingerprint gate line FGL1, and perform the reset operation according to the fingerprint scan signal $SIG_{FS2}$ transmitted by the fingerprint gate line FGL2. Therefore, in FIG. 1, the peripheral circuit 110 may also comprise a shift register SR(M+1), a demultiplexer DMUX(M+1), a voltage conversion circuit LS(M+1), and a fingerprint gate line FGL(M+1), and the photosensitive pixel FP(M,1) to the photosensitive pixel FP(M,N) can also be electrically connected to the fingerprint gate line FGL(M+1) to receive the fingerprint scan signal $SIG_{FS(M+1)}$ generated by the shift register SR(M+1) to perform the reset operation.

Furthermore, in the embodiment of FIG. 1, the display device 100 may further comprise a display scan driver 120, a fingerprint scan driver 130, and an OR gate OR1. The display scan driver 120 can generate a display scan start signal $SIG_{DI1}$, and the fingerprint scan driver 130 can generate a fingerprint scan start signal $SIG_{FI1}$. The OR gate OR1 has a first input terminal, a second input terminal and an output terminal. The first input terminal of the OR gate OR1 can be electrically connected to the display scan driver 120 to receive the display scan start signal $SIG_{DI1}$. The second input terminal of the OR gate OR1 can be electrically connected to the fingerprint scan driver 130 to receive the fingerprint scan start signal $SIG_{FI1}$. The output terminal of the OR gate OR1 can be electrically connected to the shift register SR1.

In some embodiments, the fingerprint scan driver 130 and the display scan driver 120 can generate the fingerprint scan start signal $SIG_{FI}$, and the display scan start signal $SIG_{DI1}$, at different time periods according to the same driving signal $SIG_{DRV}$. For example, when the driving signal $SIG_{DRV}$ is at a high level, the display scan driver 120 can generate the display scan start signal $SIG_{DI1}$, while the fingerprint scan driver 130 does not generate the fingerprint scan start signal $SIG_{FI1}$. When the driving signal $SIG_{DRV}$ is at a low level, the display scan driver 120 will not generate the display scan start signal $SIG_{DI1}$, and the fingerprint scan driver 130 will generate the fingerprint scan start signal $SIG_{FI1}$. However, the present disclosure is not limited thereto. In some other embodiments, the driving signal $SIG_{DRV}$, the fingerprint scan driver 130 and the display scan driver 120 may also have other operating relationships. Further the fingerprint scan driver 130 and the display scan driver 120 may be separately controlled according to different driving signals.

In some embodiments, when the display device 100 is to perform a fingerprint scanning operation through the photosensitive pixel FP(1,1) to the photosensitive pixel FP(M,N), the photosensitive pixel FP(1,1) to the photosensitive pixel FP(M,N) are reset first and then exposed to light. The photosensitive data generated from the photosensitive pixel FP(1,1) to the photosensitive pixel FP(M,N) after the light exposure is completed, such as voltages, is outputted through the data readout line DOL1 to the data readout line DOLN. In some embodiments, during the period which the photosensitive pixel FP(1,1) to the photosensitive pixel FP(M,N) are exposed to light, the display device 100 can control the display pixel DP(1,1) to the display pixel DP(M,N) to perform the display scanning operation through the peripheral circuit 110, so that the update of the display will not be interrupted for a long time due to the fingerprint scanning operation, resulting in poor image quality.

Figure 2:
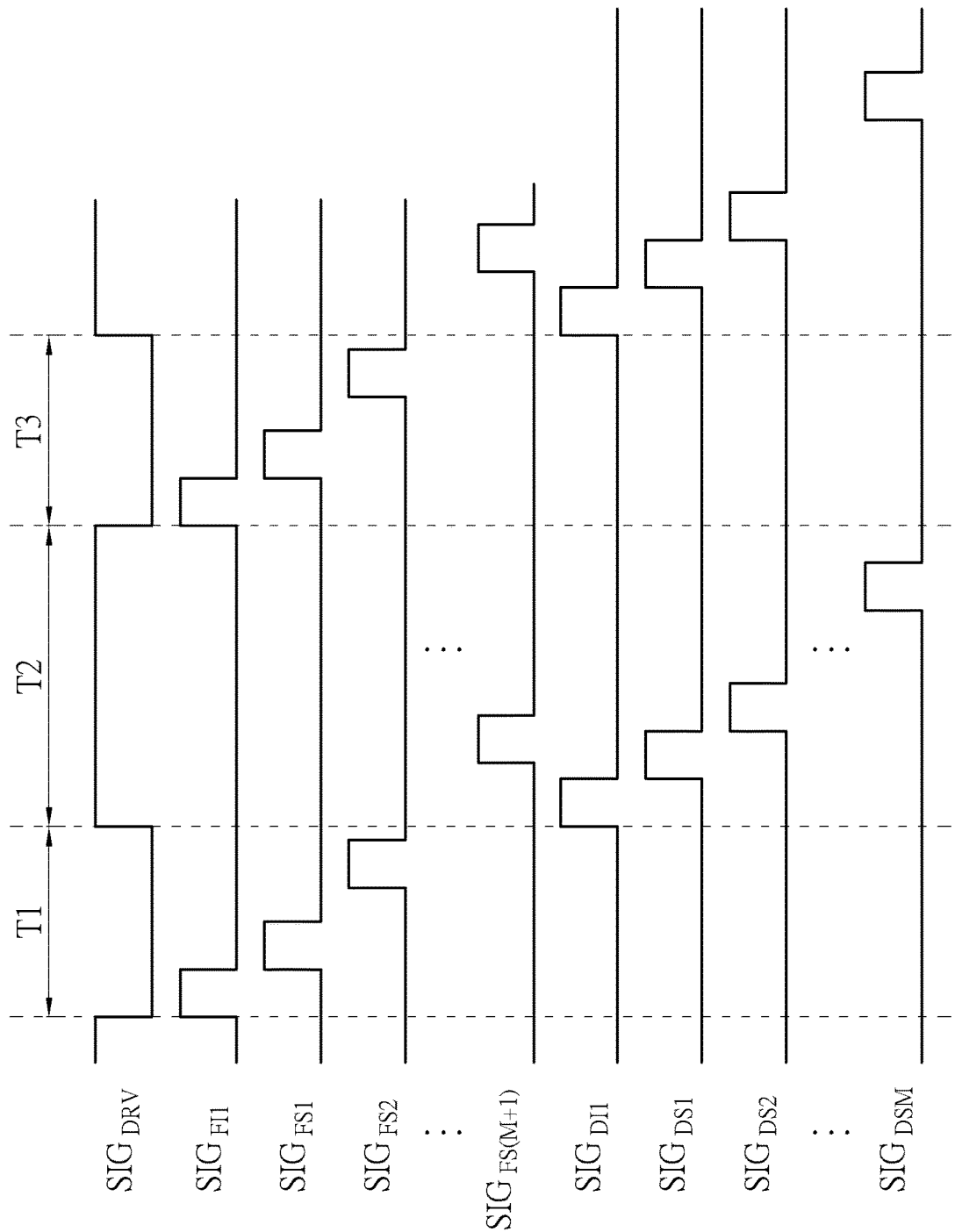
FIG. 2 is a signal timing diagram of the display device in FIG. 1 when scanning a fingerprint.

FIG. 2 is a signal timing diagram of the display device 100 during fingerprint scanning in an embodiment of the disclosure. During the fingerprint scanning period of the display device 100, the driving signal $SIG_{DRV}$ may first be at a low voltage in the period T1. At this time, the fingerprint scan driver 130 may generate the fingerprint scan start signal $SIG_{FI1}$, and the shift register SR1 to the shift register The SR(M+1) will sequentially generate the fingerprint scan signal $SIG_{FS1}$ to the fingerprint scan signal $SIG_{FS(M+1)}$ to reset the photosensitive pixel FP(1,1) to the photosensitive pixel FP(M,N). In the light-sensing process of the photosensitive pixel FP(1,1) to the photosensitive pixel FP(M,N) after resetting, the display device 100 can change the driving signal $SIG_{DRV}$ to a high voltage in the period T2. At this time, the display scan driver 120 will generate the display scan start signal $SIG_{DI1}$, and the shift register SR1 to the shift register SRM will sequentially generate the display scan signal $SIG_{DS1}$ to the display scan signal $SIG_{DSM}$, so that the display pixel DP(1,1) to the display pixel DP(M,N) can enter the scanning state and obtain the display data that the system needs to present. Then, after the photosensitive pixel FP(1,1) to the photosensitive pixel FP(M,N) are exposed to light, the driving signal $SIG_{DRV}$ can return to a low voltage in period T3, and the fingerprint scanning driver 130 can generate the fingerprint scan start signal $SIG_{FI1}$ again. The shift register SR1 to the shift register SR(M+1) will also sequentially generate the fingerprint scan signal $SIG_{FS1}$ to the fingerprint scan signal $SIG_{FS(M+1)}$ to read the photosensitive data from the data readout line DOL1 to the data readout line DOLN to read the data generated by the photosensitive pixel FP(1,1) to the photosensitive pixel FP(M,N) after exposure. Then the photosensitive pixel FP(1,1) to the photosensitive pixel FP(M,N) are reset so as to perform a following fingerprint scan.

Figure 3:
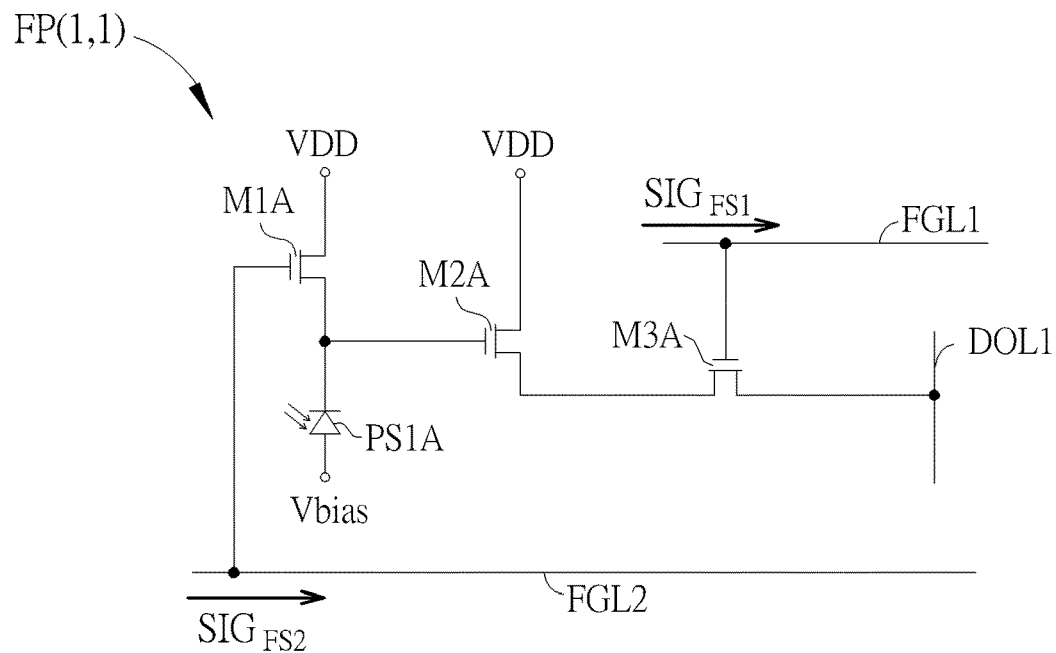
FIG. 3 is a schematic diagram of the photosensitive pixel in FIG. 1.

FIG. 3 is a schematic diagram of a photosensitive pixel FP(1,1) according to an embodiment of the disclosure. In FIG. 3, the photosensitive pixel FP(1,1) may include a photosensitive element PS1A and transistors M1A, M2A, and M3A.

The photosensitive element PS1A has a first terminal and a second terminal, and the second terminal of the photosensitive element PS1A can be electrically connected to the bias terminal Vbias. The transistor M1A has a first terminal, a second terminal, and a third terminal. The first terminal of the transistor M1A can be electrically connected to the operating voltage terminal VDD, the second terminal of the transistor M1A can be electrically connected to the first terminal of the photosensitive element PS1A, and the third terminal of the transistor M1A can be electrically connected to the fingerprint gate line FGL2. The transistor M2A has a first terminal, a second terminal, and a third terminal. The first terminal of the transistor M2A can be electrically connected to the operating voltage terminal VDD, and the third terminal of the transistor M2A can be electrically connected to the first terminal of the photosensitive element PS1A. The transistor M3A has a first terminal, a second terminal, and a third terminal. The first terminal of the transistor M3A can be electrically connected to the second terminal of the transistor M2A. The second terminal of the transistor M3A can be electrically connected to the data readout line DOL1. The third terminal of the transistor M3A can be electrically connected to the fingerprint gate line FGL1. The transistors M1A, M2A, M3A can be N-type transistors, but is not limited thereto.

In some embodiments, the photosensitive element PS1A may be a photodiode. The first terminal of the photosensitive element PS1A may be cathode. The second terminal of the photosensitive element PS1A may be anode, but is not limited thereto. The main operation of the photosensitive element PS1A may include three phases: a reset phase, a light-sensing phase, and a readout phase. In the reset phase, the voltage of the first terminal of the photosensitive element PS1A can be reset to a preset voltage. In the light-sensing phase, the photosensitive element PS1A will generate the current leakage of the photodiode reverse bias according to the received light intensity, reducing the voltage of the first terminal of the photosensitive element PS1A to varying degrees. At the end of the light-sensing phase, the voltage at the first end of the photosensitive element PS1A can be regarded as the sensing voltage of the photosensitive element PS1A. Then, in the readout phase, the photosensitive pixel FP(1,1) can generate photosensitive data according to the sensing voltage at the first end of the photosensitive element PS1A, and output it from the data readout line DOL1. In this way, the display device 100 or the processor in the system can analyze how much light has been received by the photosensitive element PS1A in the photosensitive pixel FP(1,1) according to the photosensitive data, and then determine the texture of the surface of the object, such as but not limited to fingerprints. In addition, the present disclosure is not limited to using the photodiode as the photosensitive element PS1A. In some embodiments, the photosensitive element PS1A may also be photo-transistors or CIS (CMOS Image Sensor), and the present disclosure is not limited thereto.

Take the signal timing of FIG. 2 as an example. In the period T1, when the fingerprint scanning signal $SIG_{FS2}$ is transmitted to the third terminal of the transistor M1A via the fingerprint gate line FGL2, the transistor M1A will be turned on. The voltage at the first terminal of the photosensitive element PS1A will be reset. Then, when the fingerprint gate line FGL2 returns to a low potential, the transistor M1A will be turned off, and the photosensitive element PS1A can enter the light-sensing phase at this time. In the period T3, when the fingerprint scanning signal $SIG_{FS1}$ is transmitted to the third terminal of the transistor M3A via the fingerprint gate line FGL1, the transistor M3A will be turned on. At this time, the extent the transistor M2A will be turned on is based on the voltage of the first terminal of the photosensitive element PS1A, thus the photosensitive data can be output to the data readout line DOL1 through the transistor M3A.

Figure 4:
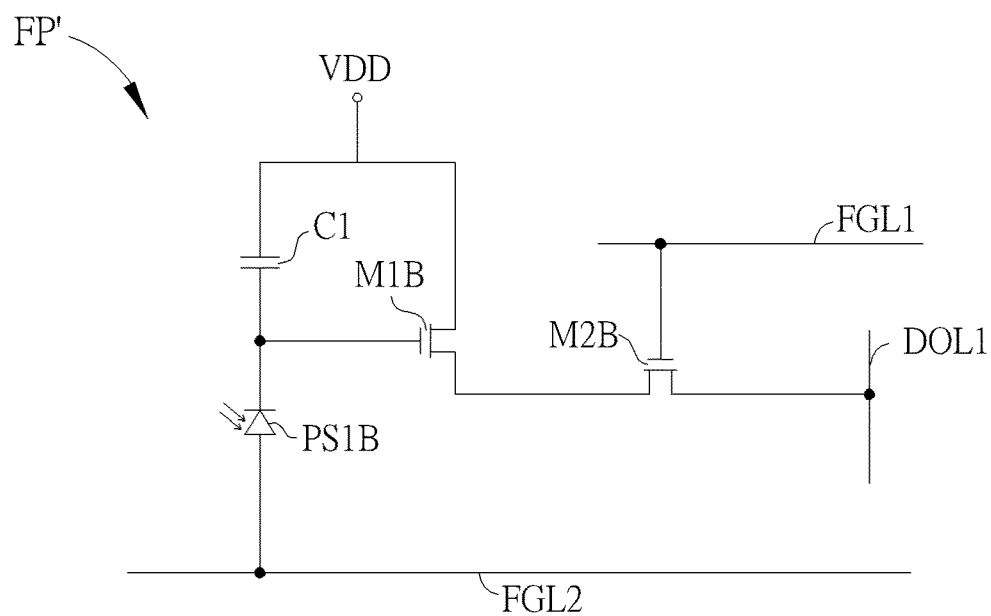
FIG. 4 is a schematic diagram of a photosensitive pixel according to another embodiment of the disclosure.

In addition, the photosensitive pixel FP(1,1) to the photosensitive pixel FP(M,N) of the present disclosure are not limited to the structure shown in FIG. 3. In some other embodiments, the photosensitive pixel FP(1,1) to the photosensitive pixel FP(M,N) also have other structures. FIG. 4 is a schematic diagram of a photosensitive pixel FP' according to another embodiment of the disclosure. In some embodiments, the photosensitive pixel FP(1,1) to the photosensitive pixel FP(M,N) in the display device 100 may also have the same structure as the photosensitive pixel FP'.

The photosensitive pixel FP' includes a photosensitive element PS1B, a capacitor C1, and transistors M1B and M2B. The photosensitive element PS1B has a first terminal, and a second terminal electrically connected to the fingerprint gate line FGL2. The capacitor C1 has a first terminal and a second terminal. The first terminal of the capacitor C1 can be electrically connected to the operating voltage terminal VDD, and the second terminal of the capacitor C1 can be electrically connected to the first terminal of the photosensitive element PS1B. The transistor M1B has a first terminal, a second terminal, and a third terminal. The first terminal of the transistor M1B can be electrically connected to the operating voltage terminal VDD, and the third terminal of the transistor M1B can be electrically connected to the first terminal of the photosensitive element PS1B. The transistor M2B has a first terminal, a second terminal, and a third terminal. The first terminal of the transistor M2B can be electrically connected to the second terminal of the transistor M1B, and the second terminal of the transistor M2B can be electrically connected to the data readout line DOL1, and the third terminal of the transistor M2B can be electrically connected to the fingerprint gate line FGL1. The transistors M1B, M2B can be N-type transistors. The photosensitive element PS1B may be a photodiode. The first terminal of the photosensitive element PS1B may be cathode. The second terminal of the photosensitive element PS1B may be anode, but is not limited thereto.

In this embodiment, when the fingerprint scan signal $SIG_{FS2}$ is transmitted to the second terminal of the photosensitive element PS1B via the fingerprint gate line FGL2, the photosensitive element PS1B will be in a forward bias, so that the voltage at the first terminal of the photosensitive element PS1B is reset. Then, when the fingerprint gate line FGL2 returns to a low potential, the photosensitive element PS1B will be in a reverse bias, and the photosensitive element PS1B can enter the light-sensing phase at this time. When the fingerprint scan signal $SIG_{FS1}$ is transmitted to the third terminal of the transistor M2B via the fingerprint gate line FGL1, the transistor M2B will be turned on. At this time, the transistor M1B will generate a corresponding voltage signal according to the voltage of the first terminal of the photosensitive element PS1B. The voltage signal is used as photosensitive data and can be output to the data readout line DOL1 through the transistor M2B.

The photosensitive pixels shown in FIGS. 3 and 4 only provide some possible embodiments of the present disclosure, and are not used to limit the structure of the photosensitive pixel FP(1,1) to the photosensitive pixel FP(M,N). In some other implementations, the photosensitive pixel FP(1,1) to the photosensitive pixel FP(M,N) may also have other structures.

In addition, in common usage scenarios, the size of a finger only occupies a small part of the screen. If whenever scanning a fingerprint, the scanning is performed on all photosensitive pixel FP(1,1) to photosensitive pixel FP(M,N), the time required to scan the fingerprint will be very long, resulting in waste of time and power. In some embodiments, the display device can scan the photosensitive pixel FP(1,1) to the photosensitive pixel FP(M,N) in separate areas through control of the peripheral device, so as to shorten the time required for fingerprint scanning.

Figure 5:
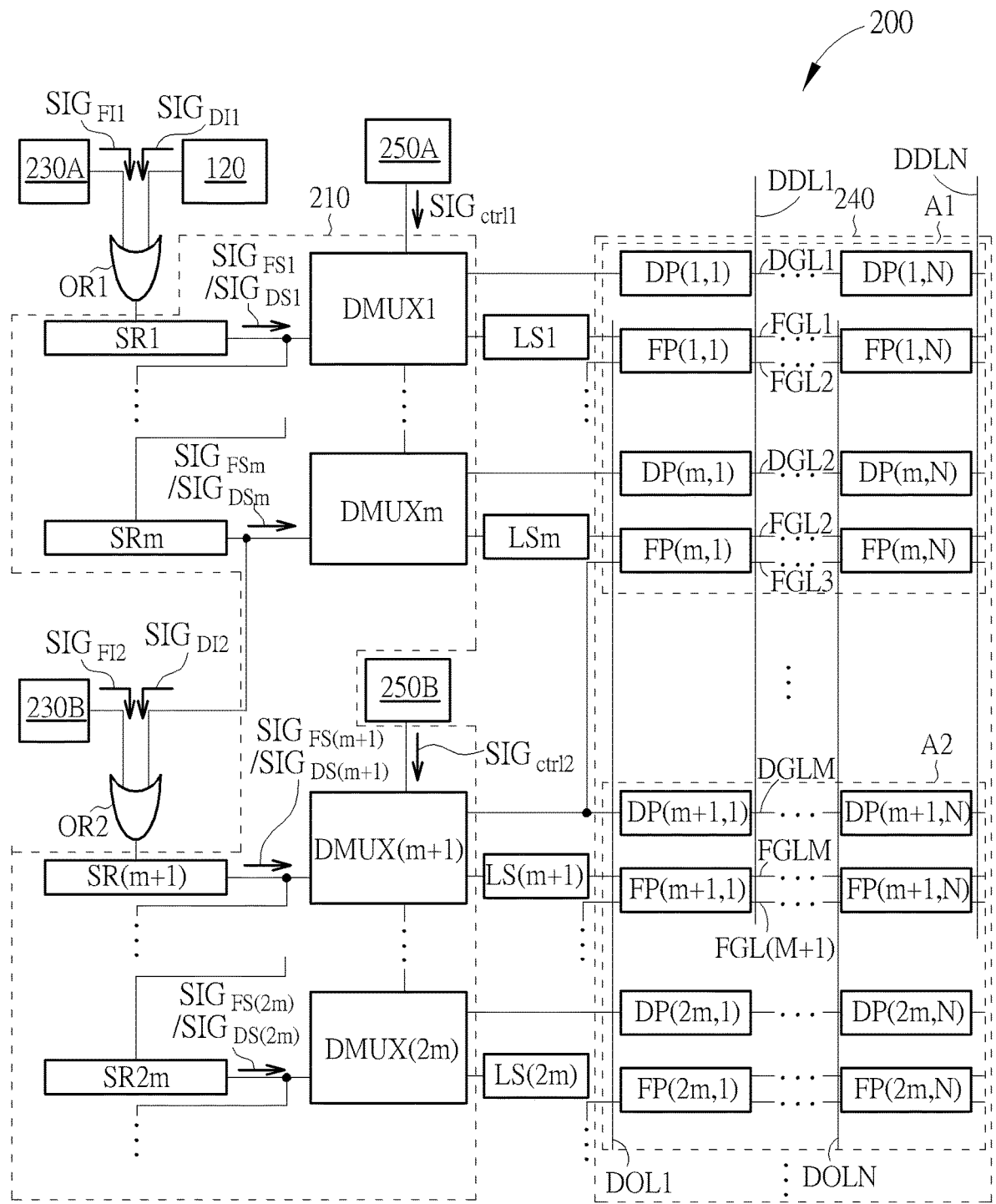
FIG. 5 is a schematic diagram of a display device according to another embodiment of the disclosure.

FIG. 5 is a schematic diagram of a display device 200 according to an embodiment of the disclosure. The display device 200 has a similar structure to the display device 100 and can operate according to similar principles. The display device 200 can divide the photosensitive pixels into different sensing areas each containing m columns, and can scan each sensing area independently, where m is an integer greater than 0 and less than M. For example, the photosensitive pixels FP(1,1) to FP(m,N) in the first to mth columns can be regarded as the photosensitive pixels in the first sensing area A1, and the photosensitive pixels FP(m+1,1) to FP(2m,N) from the (m+1)th column to the (2m)th column can be regarded as the photosensitive pixels in the second sensing area A2, and so on.

In addition, the display device 200 may include a touch module 240. The touch module 240 can determine the coordinates of the touch display device 200, and when the touch module 240 determines that the touched coordinates fall in the first sensing area A1, the peripheral circuit 210 can scan the photosensitive pixel FP(1,1) to the photosensitive pixel FP(m,N) in the first sensing area A1, but does not scan other photosensitive pixels. Similarly, when the touch module 240 determines that the touched coordinates are located in the second sensing area A2, the peripheral circuit 210 can scan the photosensitive pixel FP(m+1,1) to the photosensitive pixel FP(2m,N) in the second sensing area A2, but not other photosensitive pixels. In this way, the display device 200 can only perform fingerprint scanning for the area where the finger is located, so that the time required for fingerprint scanning can be shortened, and the efficiency of fingerprint scanning can be improved.

In this embodiment, the display device 200 may include a plurality of fingerprint scanning drivers. The fingerprint scanning driver 230A can generate the fingerprint scan start signal $SIG_{FI1}$, and the fingerprint scanning driver 230B can generate the fingerprint scan start signal $SIG_{FI2}$. For example, when the touch module 240 determines that the touched coordinates are in the first sensing area A1, the fingerprint scan driver 230A can generate the fingerprint scan start signal $SIG_{FI1}$, and the fingerprint scan driver 230B will not generate the fingerprint scan start signal $SIG_{FI2}$. At this time, the shift register SR1 can generate the fingerprint scan signal $SIG_{FS1}$ according to the fingerprint scan start signal $SIG_{FI1}$. Similarly, when the touch module 240 determines that the touched coordinates are in the second sensing area A2, the fingerprint scan driver 230B can generate the fingerprint scan start signal $SIG_{FI2}$, and the fingerprint scan driver 230A will not generate the fingerprint scan start signal $SIG_{FI1}$. At this time, the shift register SR(m+1) can generate the fingerprint scan signal $SIG_{FS(m+1)}$ according to the fingerprint scan start signal $SIG_{FI2}$.

However, the present disclosure does not limit the display device 200 to scan only one sensing area at a time. In some other embodiments, the display device 200 can also scan two or other numbers of sensing areas. For example, after the display device 200 performs fingerprint scanning on the first sensing area A1, it may continue to perform fingerprint scanning on the second sensing area A2 to ensure that a complete fingerprint can be scanned. In this case, the shift register SR(m+1) will generate the fingerprint scan signal $SIG_{FS(m+1)}$ according to the fingerprint scan signal $SIG_{FSm}$.

In FIG. 5, the display device 200 may further include an OR gate OR2. The OR gate OR2 has a first input terminal, a second input terminal and an output terminal. The first input terminal of the OR gate OR2 can be electrically connected to the shift register SRm for receiving the fingerprint scan signal $SIG_{FSm}$ and the display scan signal $SIG_{DSm}$. The second input terminal of the OR gate OR2 can receive the fingerprint scan start signal $SIG_{FI2}$. The output terminal of the OR gate OR2 can be electrically connected to the shift register SR(m+1).

In addition, in some embodiments, after the shift register SR(m+1) receives the fingerprint scan signal $SIG_{FSm}$, it will correspondingly generate the fingerprint scan signal $SIG_{FS(m+1)}$, so if the display device 200 is only to scan the photosensitive pixel FP(1,1) to the photosensitive pixel FP(m,N) in the first sensing area A1, but not the photosensitive pixel FP(m+1,1) to the photosensitive pixel FP(2m,N), the demultiplexer DMUX (m+1) to the demultiplexer DMUX (2m) can be controlled to stop transmitting the fingerprint scan signal $SIG_{FS(m+1)}$ to the fingerprint scan signal $SIG_{FS(2m)}$ to the fingerprint gate line FGL(m+1) to the fingerprint gate line FGL(2m).

For example, the display device 200 may also comprise a plurality of controllers. The controller 250A may generate a control signal $SIG_{ctrl1}$ to control the demultiplexers DMUX1 to DMUXm, and the controller 250B may generate a control signal $SIG_{ctrl2}$ to control the demultiplexers DMUX(m+1) to DMUX(2m). In other words, the display device 200 can use different controllers to control the demultiplexers corresponding to different sensing areas to ensure that the photosensitive pixels in the corresponding sensing areas can receive fingerprint scan signals in a timely manner.

Figure 6:
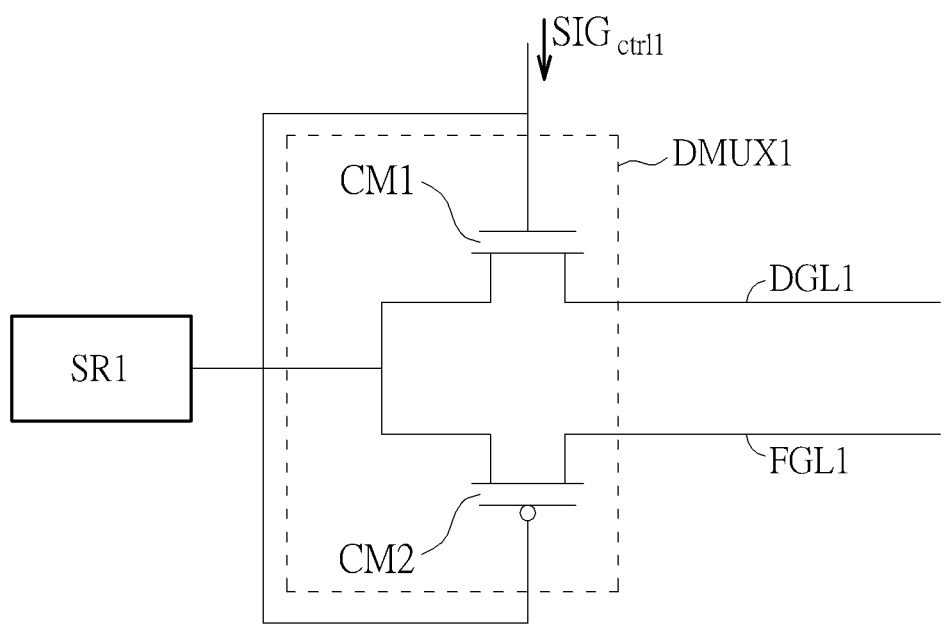
FIG. 6 is a schematic diagram of a demultiplexer of a peripheral circuit of the display device in FIG. 1.

FIG. 6 is a schematic diagram of the demultiplexer DMUX1 according to an embodiment of the disclosure. The demultiplexer DMUX1 may include a first control transistor CM1 and a second control transistor CM2. The first control transistor CM1 has a first terminal, a second terminal and a third terminal. The first terminal of the first control transistor CM1 can be electrically connected to the shift register SR1, and the second terminal of the first control transistor CM1 can be electrically connected to the display gate line DGL1. The second control transistor CM2 has a first terminal, a second terminal, and a third terminal. The first terminal of the second control transistor CM2 can be electrically connected to the shift register SR1, and the second terminal of the second control transistor CM2 can be electrically connected to the fingerprint gate line FGL1.

In FIG. 6, the first control transistor CM1 is an N-type transistor, and the second control transistor CM2 is a P-type transistor. Therefore, the third terminal of the first control transistor CM1 and the third terminal of the second control transistor CM2 can receive the same control signal $SIG_{ctrl1}$. However, in some other embodiments, the first control transistor CM1 is a P-type transistor, and the second control transistor CM2 is an N-type transistor. Alternatively, in some other embodiments, the first control transistor CM1 and the second control transistor CM2 can both be N-type transistors or P-type transistors. In this case, the third terminal of the first control transistor CM1 and the third terminal of the second control transistor CM2 can receive two complementary control signals to ensure the display gate line DGL1 and fingerprint gate line FGL1 would not transmit scan signals at the same time.

In summary, the display device provided by the present disclosure can control the demultiplexers, so that the peripheral circuit can use the same circuit to generate display scan signals and fingerprint scan signals, and send the corresponding signals to the display gate lines and fingerprint gate lines. In this way, the circuit area required by the peripheral circuit can be reduced, thereby reducing the frame width of the display device.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device comprising:
   a peripheral circuit comprising a first demultiplexer and a first shift register;
   a first display gate line electrically connected to the first demultiplexer and configured to transmit a first display scan signal;
   a first fingerprint gate line electrically connected to the first demultiplexer and configured to transmit a first fingerprint scan signal;
   a display scan driver configured to generate a display scan start signal;
   a fingerprint scan driver configured to generate a fingerprint scan start signal; and
   an OR gate having a first input terminal coupled to the display scan driver for receiving the display scan start signal, a second input terminal coupled to the fingerprint scan driver for receiving the fingerprint scan start signal, and an output terminal electrically connected to the first shift register for outputting the display scan start signal or the fingerprint scan start signal;

wherein the first shift register is electrically connected to the first demultiplexer and configured to generate the first display scan signal according to the display scan start signal and generate the first fingerprint scan signal according to the fingerprint scan start signal.

2. The display device of claim 1 wherein the first demultiplexer transmits the first display scan signal via the first display gate line or transmits the first fingerprint scan signal via the first fingerprint gate line according to a first control signal.

3. The display device of claim 1 further comprising a first photosensitive pixel electrically connected to the first fingerprint gate line.

4. The display device of claim 1 further comprising a first display pixel electrically connected to the first display gate line.

5. The display device of claim 4 further comprising a display data line electrically connected to the first display pixel and configured to transmit display data to the first display pixel.

6. The display device of claim 1 further comprising:
a second display gate line configured to transmit a second display scan signal;
a second fingerprint gate line configured to transmit a second fingerprint scan signal; and
a first photosensitive pixel electrically connected to the first fingerprint gate line and the second fingerprint gate line;
wherein the peripheral circuit further comprises:
a second shift register electrically connected to the first shift register and configured to generate the second display scan signal according to the first display scan signal and generate the second fingerprint scan signal according to the first fingerprint scan signal; and
a second demultiplexer electrically connected to the second shift register, the second display gate line and the second fingerprint gate line.

7. The display device of claim 6 wherein the first photosensitive pixel comprises:
a photosensitive element having a first terminal, and a second terminal electrically connected to a bias terminal;
a first transistor having a first terminal electrically connected to an operating voltage terminal, a second terminal electrically connected to the first terminal of the photosensitive element, and a third terminal electrically connected to the second fingerprint gate line;
a second transistor having a first terminal electrically connected to the operating voltage terminal, a second terminal, and a third terminal electrically connected to the first terminal of the photosensitive element; and
a third transistor having a first terminal electrically connected to the second terminal of the second transistor, a second terminal electrically connected to a data readout line, and a third terminal electrically connected to the first fingerprint gate line.

8. The display device of claim 7 wherein the photosensitive element is a photodiode, the first terminal of the photosensitive element is cathode, the second terminal of the photosensitive element is anode, the first transistor, the second transistor and the third transistor are N-type transistors.

9. The display device of claim 6 wherein the first photosensitive pixel comprises:

a photosensitive element having a first terminal, and a second terminal electrically connected to the second fingerprint gate line;
a capacitor having a first terminal of the capacitor electrically connected to an operating voltage terminal, and a second terminal electrically connected to the first terminal of the photosensitive element;
a first transistor having a first terminal electrically connected to the operating voltage terminal, a second terminal, and a third terminal electrically connected to the first terminal of the photosensitive element; and
a second transistor having a first terminal electrically connected to the second terminal of the first transistor, a second terminal electrically connected to a data readout line, and a third terminal electrically connected to the first fingerprint gate line.

10. The display device of claim 9 wherein the photosensitive element is a photodiode, the first terminal of the photosensitive element is cathode, the second terminal of the photosensitive element is anode, and the first transistor and the second transistor are N-type transistors.

11. The display device of claim 6 further comprising:
a third display gate line configured to transmit a third display scan signal;
a fourth display gate line configured to transmit a fourth display scan signal;
a third fingerprint gate line configured to transmit a third fingerprint scan signal;
a fourth fingerprint gate line configured to transmit a fourth fingerprint scan signal; and
a third photosensitive pixel electrically connected to the third fingerprint gate line and the fourth fingerprint gate line;
wherein the peripheral circuit further comprises:
a third shift register configured to generate the third display scan signal and the third fingerprint scan signal;
a third demultiplexer electrically connected the third shift register, the third display gate line and the third fingerprint gate line;
a fourth shift register configured to generate the fourth display scan signal according to the third display scan signal and generate the fourth fingerprint scan signal according to the second fingerprint scan signal or the third fingerprint scan signal; and
a fourth demultiplexer electrically connected to the fourth shift register, the fourth display gate line and the fourth fingerprint gate line.

12. The display device of claim 1 wherein the first demultiplexer comprises:
a first control transistor having a first terminal configured to receive a control signal, and a second terminal electrically connected to the first display gate line; and
a second control transistor having a first terminal configured to receive the control signal, and a second terminal electrically connected to the first fingerprint gate line.

13. The display device of claim 12 wherein the first control transistor is an N-type transistor, and the second control transistor is a P-type transistor.

14. The display device of claim 1 wherein the first demultiplexer comprises:
a first control transistor having a first terminal configured to receive a first control signal, and a second terminal electrically connected to the first display gate line; and a second control transistor having a first terminal configured to receive a second control signal, and a second terminal electrically connected to the first fingerprint gate line;

wherein the first control signal and the second control signal are complementary to each other.

15. The display device of claim 14 wherein the first control transistor and the second control transistor are both P-type transistors or N-type transistors.

16. A display device comprising:

a peripheral circuit comprising a first demultiplexer and a first shift register;

a first display gate line electrically connected to the first demultiplexer and configured to transmit a first display scan signal; and a first fingerprint gate line electrically connected to the first demultiplexer and configured to transmit a first fingerprint scan signal;

wherein the first shift register electrically connected to the first demultiplexer and configured to generate the first display scan signal according to a display scan start signal and generate the first fingerprint scan signal according to a fingerprint scan start signal; and wherein during a fingerprint scanning period of the display device:

the display device generates the first fingerprint scan start signal to reset a plurality of photosensitive pixels in the display device;

while performing light-sensing after resetting the plurality of photosensitive pixels, the display device generates the display scan start signal; and after the plurality of photosensitive pixels complete light-sensing, the display device generates the first fingerprint scan signal again to read sensing data generated by the plurality of photosensitive pixels.

17. A display device comprising:

a peripheral circuit comprising:

a first demultiplexer;

an (m+1)th shift register;

an mth demultiplexer; and an mth shift register electrically connected to the (m+1)th shift register and the mth demultiplexer and configured to generate an mth display scan signal according to an (m+1)th display scan signal and generate an mth fingerprint scan signal according to an (m+1)th fingerprint scan signal, m being a positive integer greater than 1;

a first display gate line electrically connected to the first demultiplexer and configured to transmit a first display scan signal;

a first fingerprint gate line electrically connected to the first demultiplexer and configured to transmit a first fingerprint scan signal;

an (m+1)th shift register;

a fingerprint scan driver configured to generate a fingerprint scan start signal; and an OR gate having a first input terminal coupled to the mth shift register for receiving the mth display scan signal and the mth fingerprint scan signal, a second input terminal coupled to the fingerprint scan driver for receiving the fingerprint scan start signal, and an output terminal electrically connected to the (m+1)th shift register for outputting the mth display scan signal or the fingerprint scan start signal to the (m+1)th shift register.

* * * * *